US008209264B2

(12) United States Patent
Wakabayashi et al.

(10) Patent No.: US 8,209,264 B2
(45) Date of Patent: Jun. 26, 2012

(54) ENTERING AND LEAVING MANAGEMENT SYSTEM

(75) Inventors: Masao Wakabayashi, Tokyo (JP); Takeshi Mio, Tokyo (JP); Seiji Okumura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 897 days.

(21) Appl. No.: 12/248,543

(22) Filed: Oct. 9, 2008

(65) Prior Publication Data

US 2009/0116700 A1 May 7, 2009

(30) Foreign Application Priority Data

Nov. 6, 2007 (JP) ................................. 2007-288710

(51) Int. Cl.
*G06Q 20/00* (2012.01)
*G05B 19/00* (2006.01)

(52) U.S. Cl. ........... 705/76; 705/50; 705/13; 340/573.4; 340/5.2

(58) Field of Classification Search ................ 705/13, 705/76; 340/537.4
See application file for complete search history.

(56) References Cited

U.S. PATENT DOCUMENTS

| | | | | |
|---|---|---|---|---|
| 5,742,685 A * | 4/1998 | Berson et al. | .................. | 713/186 |
| 5,991,429 A * | 11/1999 | Coffin et al. | .................. | 382/118 |
| 6,659,947 B1 * | 12/2003 | Carter et al. | .................. | 600/300 |
| 6,976,269 B1 * | 12/2005 | Avery et al. | ......................... | 726/2 |
| 7,145,457 B2 * | 12/2006 | Spitz et al. | .................. | 340/572.1 |
| 7,284,698 B2 | 10/2007 | Sogo | | |
| 7,818,083 B2 * | 10/2010 | Glenn et al. | .................. | 700/108 |
| 7,864,058 B2 * | 1/2011 | Kondo et al. | ............... | 340/573.1 |
| 2003/0138135 A1 * | 7/2003 | Chung et al. | .................. | 382/119 |
| 2003/0163710 A1 * | 8/2003 | Ortiz et al. | ..................... | 713/186 |
| 2003/0169906 A1 * | 9/2003 | Gokturk et al. | ............... | 382/115 |
| 2004/0036573 A1 * | 2/2004 | Fitzgibbon et al. | .......... | 340/5.64 |
| 2004/0056089 A1 * | 3/2004 | Larson et al. | ................. | 235/382 |
| 2004/0143737 A1 * | 7/2004 | Teicher | ......................... | 713/167 |
| 2005/0077348 A1 * | 4/2005 | Hendrick | ...................... | 235/380 |
| 2005/0099288 A1 * | 5/2005 | Spitz et al. | ..................... | 340/506 |
| 2005/0116821 A1 * | 6/2005 | Wilsey et al. | ............ | 340/539.13 |
| 2006/0157559 A1 * | 7/2006 | Levy et al. | ..................... | 235/380 |
| 2006/0206246 A1 * | 9/2006 | Walker | ............................ | 701/16 |

(Continued)

FOREIGN PATENT DOCUMENTS

CN 1661634 A 8/2005

(Continued)

OTHER PUBLICATIONS

"ISO/IEC FDIS 24730-2", all pages, 2006.*

(Continued)

*Primary Examiner* — James A Reagan
*Assistant Examiner* — Calvin Cheung
(74) *Attorney, Agent, or Firm* — Oblon, Spivak, McClelland, Maier & Neustadt, L.L.P.

(57) ABSTRACT

An entering and leaving management system is provided. The management system includes a management terminal including: an authentication history information acquisition section configured to acquire authentication history information; a registered person image acquisition section configured to acquire a registered person image recorded associated with personal identification data of the authentication history information; an image acquisition section configured to acquire an image of a person to be authenticated, recorded associated with an authentication time of the authentication history information; and a listing section configured to list the registered person images and the image of the person to be authenticated on the operation screen side by side with the authentication history information.

6 Claims, 12 Drawing Sheets

U.S. PATENT DOCUMENTS

| | | | |
|---|---|---|---|
| 2006/0210123 A1* | 9/2006 | Kondo et al. | 382/117 |
| 2007/0153258 A1* | 7/2007 | Hernandez | 356/71 |
| 2007/0186106 A1* | 8/2007 | Ting et al. | 713/168 |
| 2007/0292008 A1* | 12/2007 | Yumoto et al. | 382/124 |
| 2009/0092283 A1* | 4/2009 | Whillock et al. | 382/103 |
| 2009/0178144 A1* | 7/2009 | Redlich et al. | 726/27 |
| 2009/0179753 A1* | 7/2009 | Bonner et al. | 340/539.32 |
| 2009/0189736 A1 | 7/2009 | Hayashi | |
| 2010/0060452 A1* | 3/2010 | Schuster et al. | 340/572.1 |
| 2010/0156599 A1* | 6/2010 | Ainsbury et al. | 340/10.1 |
| 2010/0252626 A1* | 10/2010 | Elizondo et al. | 235/385 |
| 2010/0289646 A1* | 11/2010 | Raniere | 340/572.1 |
| 2010/0328443 A1* | 12/2010 | Lynam et al. | 348/77 |

FOREIGN PATENT DOCUMENTS

| | | |
|---|---|---|
| EP | 1 868 132 A1 | 12/2007 |
| JP | 2003-27796 | 1/2003 |
| JP | 2004-78687 | 3/2004 |
| JP | 2004-252744 | 9/2004 |
| JP | 2005-32050 | 2/2005 |
| WO | 2006/101169 A1 | 9/2006 |

OTHER PUBLICATIONS

"Real Time Location Systems (RTLS)", Nanotron Technologies GmbH, all pages, 2006. http://www.nanotron.com/EN/pdf/WP_RTLS.pdf.*

* cited by examiner

FIG. 6

| Registered Person Image | Image at Authentication Time | Name, Attached to | Date and Time | Room, Door | Description | Authentication |
|---|---|---|---|---|---|---|
|  |  | Personnel Department ○○○○ | 2007/10/25 15:19:34 | X Room North Door | Entering | Success |
|  |  | General Affairs Department × × × × | 2007/10/25 15:29:34 | Y Room North Door | Entering | Success |
|  |  |  | 2007/10/25 15:39:34 | Y Room East Door |  | Failure |
|  |  | A Company △△△△ | 2007/10/25 15:49:34 | Y Room East Door | Entering | Success |
|  |  |  | 2007/10/25 15:59:34 | Y Room North Door |  | Failure |
|  |  | Personnel Department ○○○○ | 2007/10/25 16:19:34 | X Room North Door | Leaving | Success |

FIG. 9

| Registered Person Image | Image at Authentication Time | Name, Attached to | Date and Time | Room, Door |
|---|---|---|---|---|
| | | Personnel Department ○○○○ | 2007/10/25 15:19:34 | X Room North Door |
| | | General Affairs Department × × × × | 2007/10/25 15:29:34 | Y Room North Door |
| | | Miscellaneous Department × ○ × ○ | 2007/10/25 15:39:34 | Y Room East Door |
| | | A Company △ △ △ △ | 2007/10/25 15:49:34 | Y Room East Door |
| | | General Affairs Department × △ × △ | 2007/10/25 15:59:34 | Y Room North Door |
| | | Accounting Department ○ × ○ × | 2007/10/25 16:19:34 | X Room North Door |

ENTERING AND LEAVING MANAGEMENT SYSTEM

BACKGROUND OF THE INVENTION

1. Field of the Invention

The present invention relates to an entering and leaving management system.

2. Description of the Related Art

As an entering and leaving management system in a related art, for example, JP-A-2003-27796 discloses an entering and leaving management system for determining a person performing personal authentication operation at the entering or leaving time based on the personal authentication result of biometrics. In the entering and leaving management system in the related art, a taken image is stored in association with the authentication result at the entering or leaving time, whereby the person performing the personal authentication operation is checked. The personal authentication results are listed on a screen of an operation terminal and at the viewing time of the personal authentication result, the taken image associated with the personal authentication result is displayed in a separate window. Accordingly, if the personal authentication result is check OK, the person name can be determined. If the personal authentication result is check NG, the person name cannot be determined, but the person can be checked according to the taken image as a suspicious person, so that security is enhanced.

Since the taken image at the authentication operation time is displayed in the entering and leaving management system in the related art, it is difficult for one person to masquerade as another person by conducting personal authentication of biometrics as in the above-mentioned JP-A-2003-27796; the system becomes highly effective. However, there are a large number of entering and leaving management systems for conducting personal authentication using an IC card represented by an employee ID card, etc., because the introduction cost can be suppressed and the system is excellent in convenience as compared with the biometrics. For system administration using such an IC card, personal authentication of one person masquerading as another person may be conducted by fraud of a stolen card, etc. If authentication of one person masquerading as another person is conducted, it is difficult to identify a suspicious person illegally entering and leaving the room if only the taken image at the personal authentication operation time is displayed as in the related art example; this is a problem.

SUMMARY OF THE INVENTION

It is therefore an object of the present invention to more easily check a suspicious person by displaying the taken image at the personal authentication operation time and the registered person image previously associated with the personal identification data checked by an authentication management apparatus together.

According to an aspect of the preset invention, there is provided an entering and leaving management system includes a registered person information record section configured to record personal identification data and a registered person image in association with each other; a personal identification data reader configured to read the personal identification data of a person to be authenticated; an authentication management apparatus configured to check the personal identification data recorded in the registered person information record section based on the personal identification data of the person to be authenticated read through the personal identification data reader and control unlocking and locking of a gateway based on the personal authentication result; an imaging apparatus configured to take an image of the person to be authenticated and operating the personal identification data reader; an image recorder configured to record the image of the person to be authenticated, taken by the imaging apparatus; an authentication history information record section configured to record the personal authentication result of the personal identification data checked by the authentication management apparatus and the authentication time as authentication history information; and a management terminal configured to display the authentication history information recorded in the authentication history information record section on an operation screen. The management terminal includes: an authentication history information acquisition section configured to acquire the authentication history information recorded in the authentication history information record section; a registered person image acquisition section configured to acquire the registered person image recorded in the registered person information record section associated with the personal identification data of the authentication history information acquired by the authentication history information acquisition section; an image acquisition section configured to acquire the image of the person to be authenticated, recorded in the image recorder associated with the authentication time of the authentication history information acquired by the authentication history information acquisition section; and a listing section configured to list the registered person images acquired by the registered person image acquisition section and the image of the person to be authenticated, acquired by the image acquisition section on the operation screen side by side with the authentication history information.

According to the above configuration, the taken image at the authentication operation time and the registered person image associated with the personal identification data checked by the authentication management apparatus are displayed together with the authentication history information or the authentication history information of the persons staying in the room, so that an authentication history information list for easy retrieval of illegal entering and leaving as they are compared can be presented to the manager of the entering and leaving management system and the operator of the management terminal. Further, the record image at the authentication operation time associated with the authentication history information or the authentication history information of the persons staying in the room can be played back, so that the efficiency of checking a suspicious person image can be improved.

BRIEF DESCRIPTION OF THE DRAWINGS

Embodiments of the present invention will be described in detail based on the following figures, wherein:

FIG. 6 is a schematic representation to show an example of a listing screen of authentication history information according to the entering and leaving management system in the first embodiment of the present invention;

FIG. 9 is a schematic representation to show an example of a listing screen of authentication history information according to the entering and leaving management system in the second embodiment of the present invention;

DETAILED DESCRIPTION OF THE INVENTION

Embodiments of an entering and leaving management system according to the present invention will be discussed.

First Embodiment

An entering and leaving management system for displaying authentication history information based on the personal authentication result of a person performing personal authentication operation (person to be authenticated) on a screen of a management terminal when the person performs the personal authentication operation in an authentication management apparatus will be discussed in a first embodiment of the present invention.

Figure 1:
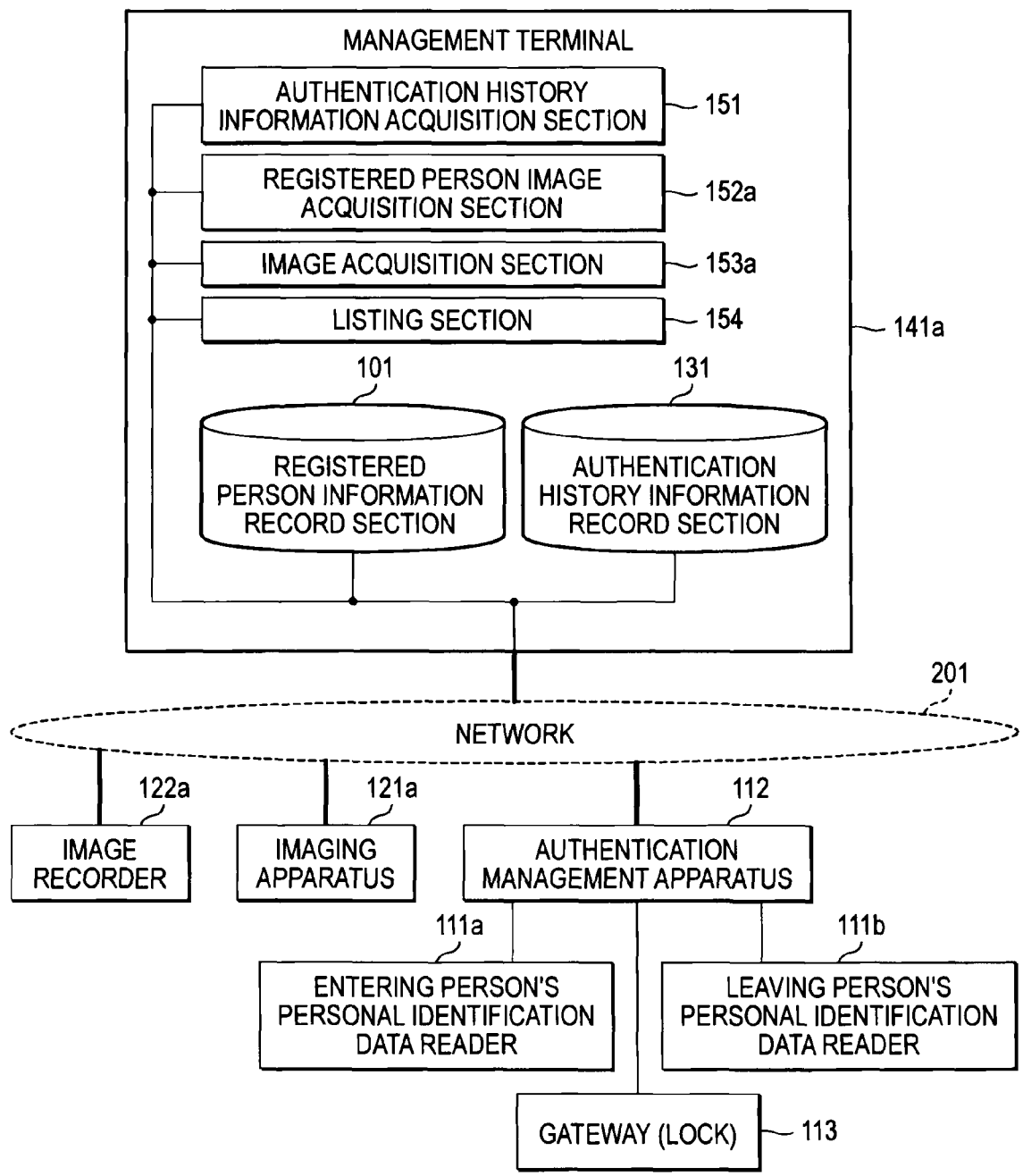
FIG. 1 is a block diagram to show a configuration example of an entering and leaving management system in a first embodiment of the present invention.

FIG. 1 is a block diagram to show a configuration example of the entering and leaving management system in the first embodiment of the present invention.

In FIG. 1, a registered person information record section 101 records personal identification data and a registered person image in association with each other. A personal identification data reader 111 reads the personal identification data of a person to be authenticated. An authentication management apparatus 112 checks the personal identification data recorded in the registered person information record section 101 based on the personal identification data of the person to be authenticated, read through the personal identification data reader 111, and controls unlocking and locking a doorway based on based on the personal authentication result of the person. An imaging apparatus 121a takes an image of the person to be authenticated operating the personal identification data reader 111. An image recorder 122a records the image of the person to be authenticated, taken by the imaging apparatus 121a. An authentication history information record section 131 records the personal authentication result of the personal identification data checked by the authentication management apparatus 112 and the authentication time as authentication history information. A management terminal 141a displays the authentication history information recorded in the authentication history information record section 131 on an operation screen.

The internal configuration of the management terminal 141a is as follows: An authentication history information acquisition section 151 acquires the authentication history information recorded in the authentication history information record section 131. A registered person image acquisition section 152a acquires the registered person image recorded in the registered person information record section 101 associated with the personal identification data of the authentication history information acquired by the authentication history information acquisition section 151. An image acquisition section 153a acquires the image of the person to be authenticated, recorded in the image recorder 122a associated with the authentication time of the authentication history information acquired by the authentication history information acquisition section 151. A listing section 154 lists the registered person image acquired by the registered person image acquisition section 152a and the image of the person to be authenticated, acquired by the image acquisition section 153a on the operation screen with the authentication history information side by side.

Figure 2:
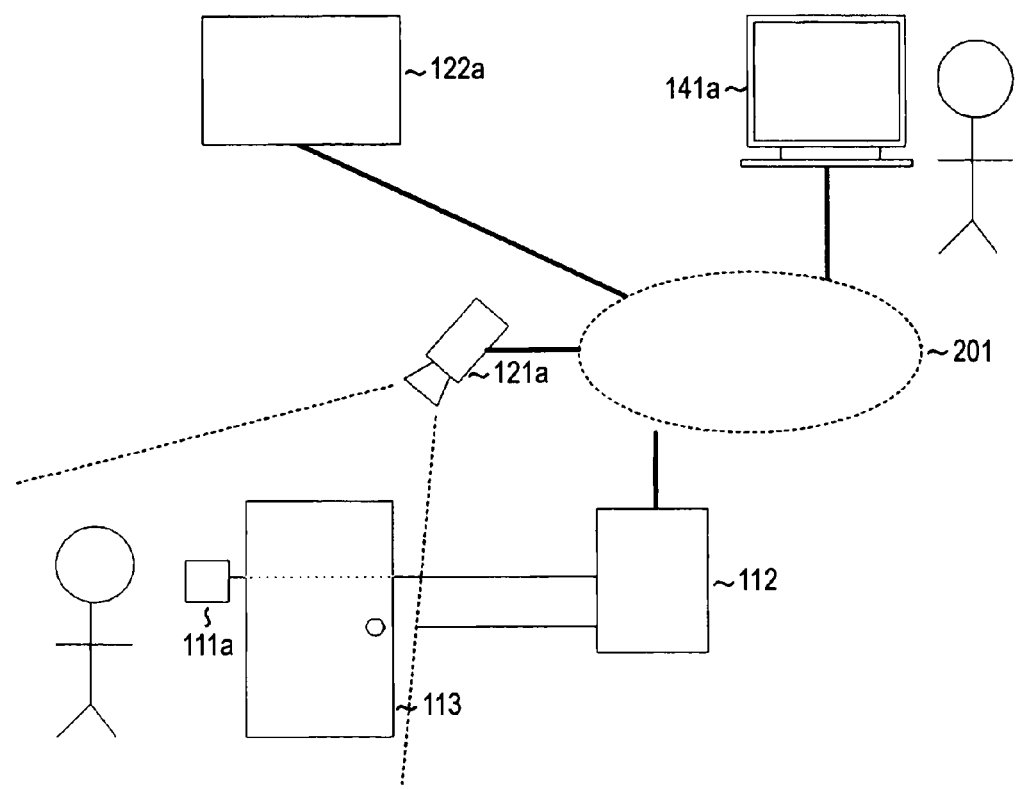
FIG. 2 is a schematic representation to show an example of an administration image of the entering and leaving management system in the first embodiment of the present invention.

FIG. 2 is a schematic representation to show an example of an administration image of the entering and leaving management system in the first embodiment of the present invention.

In FIG. 2, the authentication management apparatus 112, the imaging apparatus 121a, the image recorder 122a, and the management terminal 141a are connected by a network 201 and can communicate with each other. The registered person information record section 101 (not shown in FIG. 2) and the authentication history information record section 131 (not shown in FIG. 2) may be provided separately and connected by the network 201; here, it is assumed that they are contained in the management terminal 141a, and stored data is read and written from the management terminal 141a. The imaging apparatus 121a takes the gateway and the peripheries of an entering person's personal identification data reader 111a and a leaving person's personal identification data reader 111b, and the taken image is recorded in the image recorder 122a through the network 201.

The entering person's personal identification data reader 111a and the leaving person's personal identification data reader 111b are connected to the authentication management apparatus 112 for transmitting the personal identification data of the person to be authenticated, provided by authentication operation to the authentication management apparatus 112. FIG. 2 shows one personal identification data reader 111a of the entering person's personal identification data reader 111a and the leaving person's personal identification data reader 111b. The authentication management apparatus 112 makes a comparison between the personal identification data of the person to be authenticated, read through the entering person's personal identification data reader 111a or the leaving person's personal identification data reader 111b and the personal identification data previously registered in the registered person information record section 101, and controls opening and closing a gateway lock 113 based on the personal authentication result.

In the configuration in FIG. 2, the authentication management apparatus 112 reads the personal identification data previously registered in the registered person information record section 101 in the management terminal 141a via the management terminal 141a. However, the authentication management apparatus 112 may read the personal identification data previously registered in the registered person information record section 101 in sequence at the personal authentication operation time for a comparison or may previously read personal identification data into internal memory of the authentication management apparatus 112 and hold the personal identification data collectively and may make a comparison between the held personal identification data and the personal identification data of the person to be authenticated.

The imaging apparatus 121a sends the taken image to the image recorder 122a, but the taken image to the image recorder 122a may always record the image sent from the imaging apparatus 121a. The image recorder 122a may store an image as it is informed that the personal identification data reader 111 reads personal identification data. At this time, the image recorder 122a may include a predetermined-time image buffer and hold images and may record images from the past images for the predetermined time since the personal identification data was read.

Figure 3:
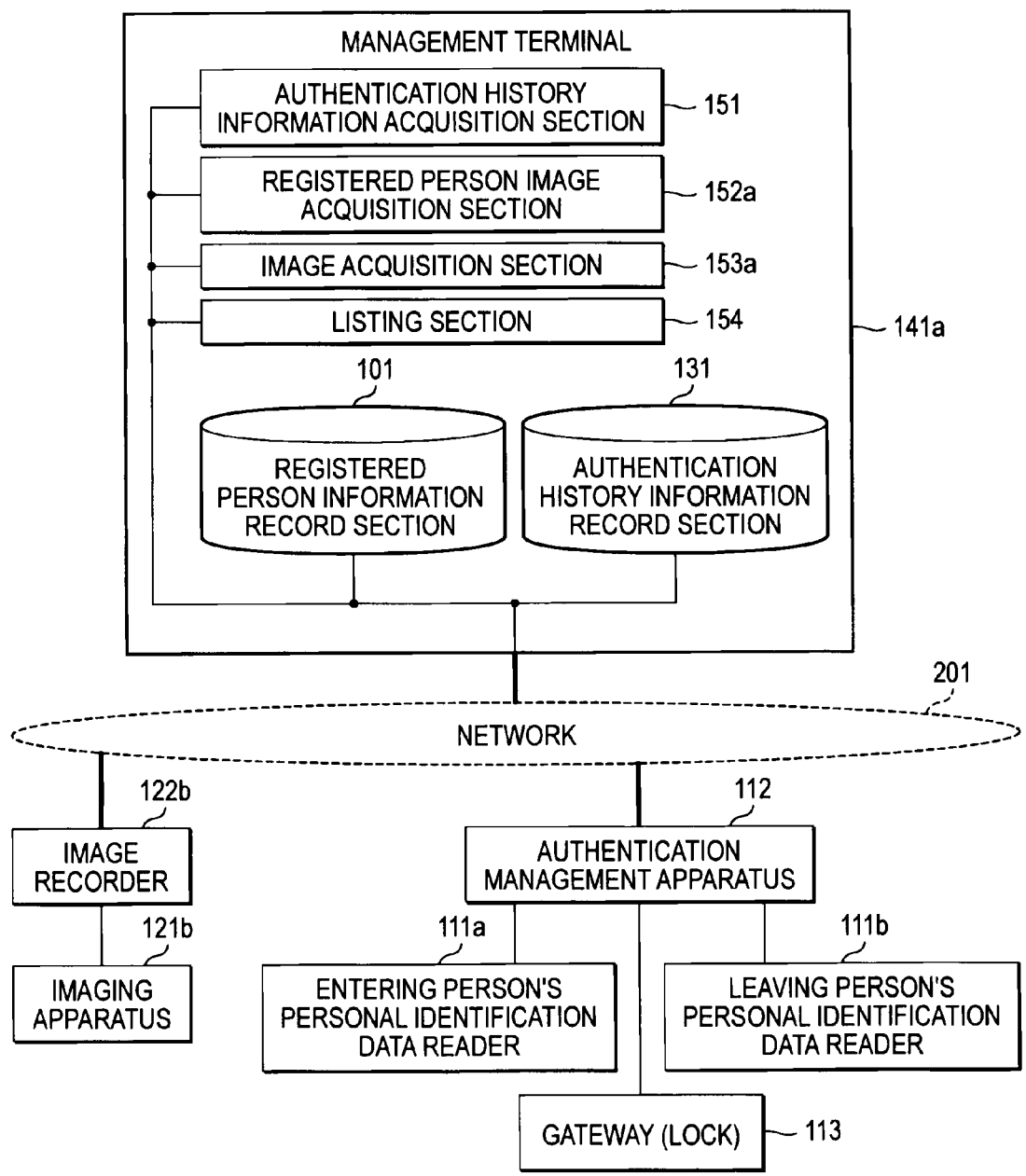
FIG. 3 is a block diagram to show a modified example of the configuration of the entering and leaving management system in the first embodiment of the present invention.

To simplify the description, only one authentication management apparatus 112, only one imaging apparatus 121a, and only one image recorder 122a are shown in the configuration of the first embodiment of the present invention shown in FIGS. 1 and 2, but a plurality of units of each apparatus (reader) can also be placed as required for conducting entering and leaving management. For example, the imaging apparatus 121a may be placed on both sides with the gateway between, needless to say; two image recorders 122a may be connected to the two imaging apparatus 121a in a one-to-one correspondence or a plurality of imaging apparatus 121a may be connected to one image recorder 122a. The number of the imaging apparatus 121a placed at one gateway is not limited to one or one for entering and one for leaving and may be two or more. Further, the imaging apparatus 121a may be connected directly to the image recorder 122a (imaging apparatus 121b and image recorder 122b) without being connected to the network, as in a modified example shown in FIG. 3.

Further, one authentication management apparatus 112 may conduct centralized management of the personal identification data readers 111 at a plurality of gateways connected directly or via the network. A pair of the entering person's personal identification data reader 111a and the leaving person's personal identification data reader 111b is installed for each gateway for entering and leaving. However, if leaving management is not conducted, the leaving person's personal identification data reader 111b becomes unnecessary and only the entering person's personal identification data reader 111a may be provided in the system configuration. Record media to read the personal identification data through the personal identification data reader 111 include a noncontact IC card, a contact magnetic stripe card, etc., for example, but the present invention is not limited to the record method of the personal identification data on the record media or the shape of a card, and further the person to be authenticated may be requested to enter the personal identification number at the reading time of the personal identification data.

Figure 4:
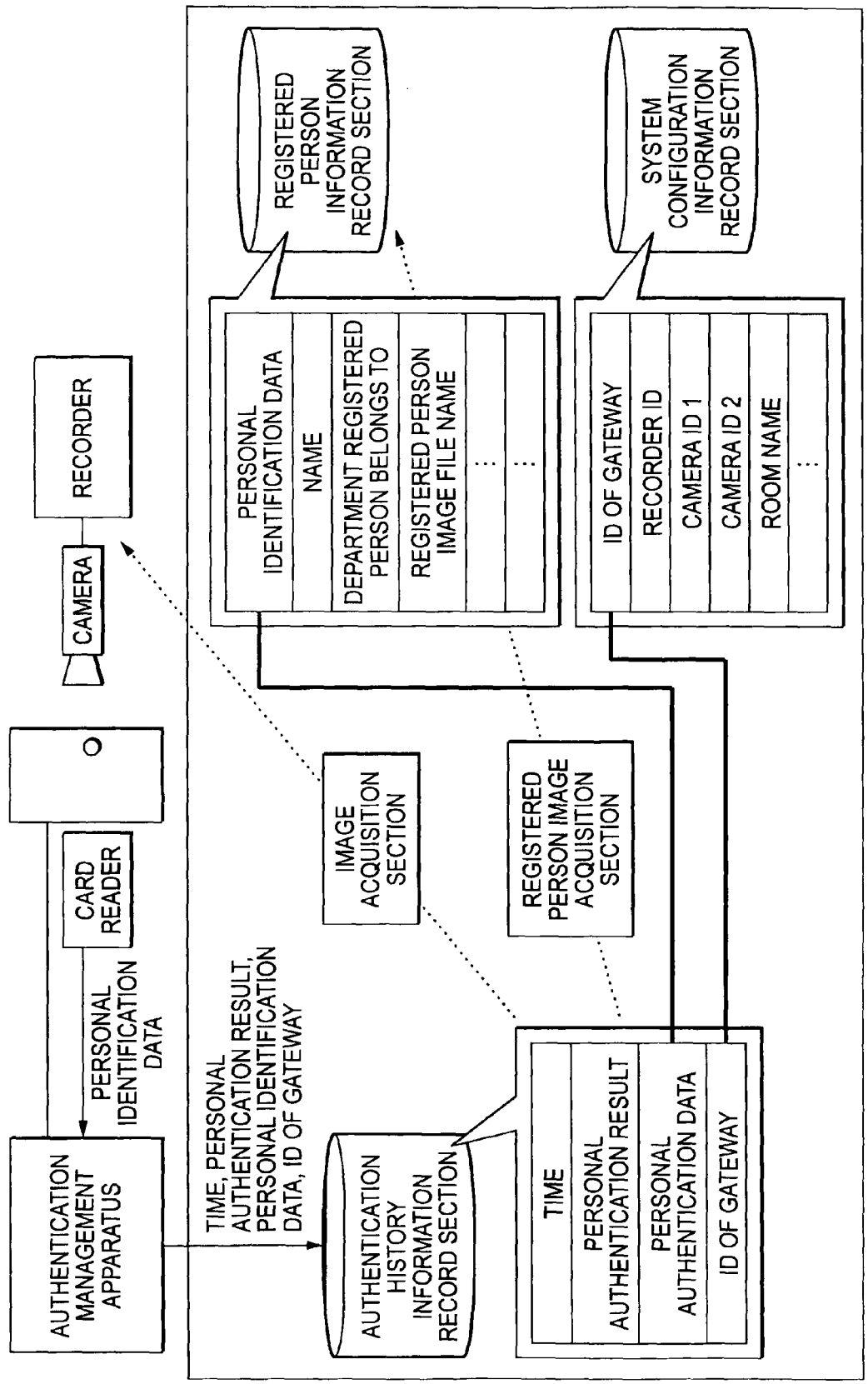
FIG. 4 is a schematic representation to show an example of the information exchange relationship according to the entering and leaving management system in the first embodiment of the present invention.

FIG. 4 is a schematic representation to show an example of the information exchange relationship according to the entering and leaving management system in the first embodiment of the present invention.

In FIG. 4, when the person to be authenticated performs personal authentication operation, the authentication history information record section 131 receives the time of the personal authentication operation, the personal authentication result, the personal identification data read through the personal identification data reader 111, and the ID of the gateway from the authentication management apparatus 112 and records them as authentication history information. As the authentication history information, information for each of the personal identification data readers 111a and 111b and any other information may be recorded in combination. At this time, the imaging apparatus (camera) 121a takes the person to be authenticated performing the personal authentication operation and the image recorder 122a records the taken image. This recorded image is managed in association with the camera ID and the time.

If the number of the gateways to be managed by the entering and leaving management system is one, the ID of the gateway can be determined and thus need not necessarily be managed. Similar comments apply to the camera ID if the number of the cameras to be managed is one and the recorder ID if the number of the recorders to be managed is one. Management based on the gateway ID, the camera ID, and the recorder ID will also be discussed by assuming that more than one gateway, more than one camera, and more than one recorder exist.

In the authentication history information in the authentication history information record section 131 of the management terminal 141a, the personal identification data is compared with the personal identification data recorded in the registered person information record section 101. If they match, registered person information of the name of the registered person, the department the registered person is attached to, the registered person image file name, etc., is obtained as information of the registered person associated with the personal identification data. From the obtained registered person image file name, the registered person image acquisition section 152a can reference the registered person image.

In the authentication history information, the ID of the gateway is compared with the ID of the gateway of information in a system configuration information record section and information of the recorder ID, the camera ID, the room name, etc., is obtained to determine the record image at the authentication operation time at the gateway. From the recorder ID, the camera ID, and the personal authentication operation time of the authentication history information, the image acquisition section 153a can reference the record image based on the personal identification data.

Figure 5:
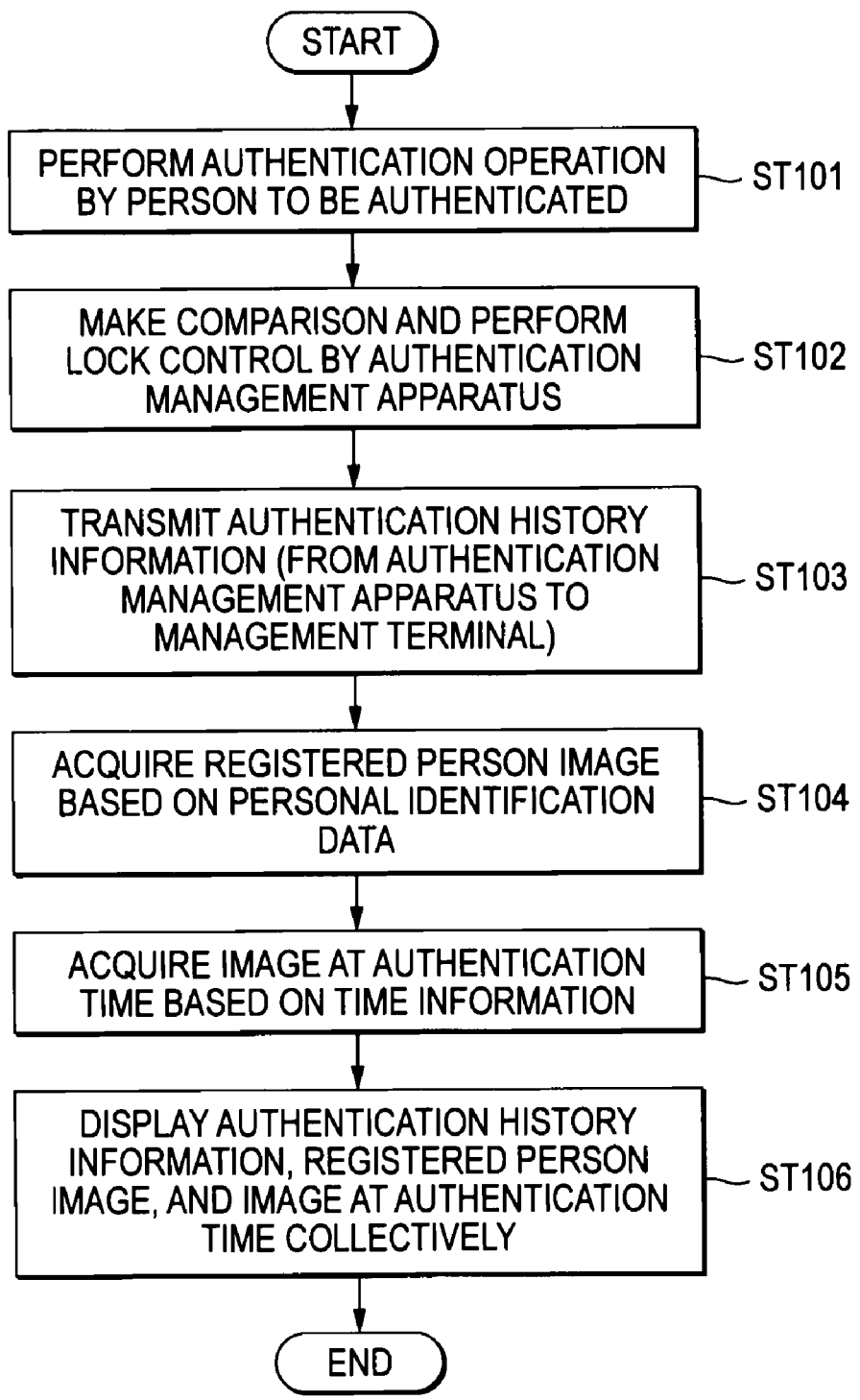
FIG. 5 is a flowchart to show an example of an entering and leaving management processing procedure according to the entering and leaving management system in the first embodiment of the present invention.

FIG. 5 is a flowchart to show an example of an entering and leaving management processing procedure according to the entering and leaving management system in the first embodiment of the present invention.

The operation at steps will be discussed with reference to FIG. 5.

When the person to be authenticated attempting to enter the room through the gateway performs authentication operation using an IC card, for example, the entering person's personal identification data reader 111a reads the personal identification data of the person to be authenticated from the IC card and transmits the personal identification data to the authentication management apparatus 112 (step ST101).

The authentication management apparatus 112 makes a comparison between the personal identification data of the person to be authenticated, received from the entering person's personal identification data reader 111a and the personal identification data previously registered in the registered person information record section 101 and controls opening and closing the gateway lock 113 based on the personal authentication result (step ST102). That is, when the personal authentication results in success, the gateway lock 113 is opened for permitting the person to enter the room; when the personal authentication results in failure, the gateway lock 113 remains closed for prohibiting the person from entering the room.

The authentication management apparatus 112 transmits authentication history information containing the personal identification data of the person to be authenticated, time information of the authentication operation time, the names of the room and door (gateway location), the authentication result (success or failure), the description (entry or exit), etc., to the authentication history information record section 131 for recording the authentication history information (step ST103).

The management terminal 141a reads the authentication history information from the authentication history information record section 131 and acquires the registered person image registered in the registered person information record section 101 with the personal identification data contained in the read authentication history information as a key (step ST104).

The management terminal 141a reads the authentication history information from the authentication history information record section 131 and acquires the taken image at the authentication operation time from the image recorder 122a with the time information of the authentication operation time contained in the read authentication history information as a key (step ST105).

The management terminal 141a lists the authentication history information read from the authentication history information record section 131, the registered person image acquired from the registered person information record section 101, and the taken image at the authentication operation time acquired from the image recorder 122a on the operation screen side by side (step ST106).

If the authentication operation results in failure at step ST102, the authentication management apparatus 112 cannot transmit the personal identification data to the authentication history information record section 131 at step ST103 and therefore the registered person image registered in the registered person information record section 101 cannot be acquired at step ST104 and consequently the authentication history information except the registered person image is displayed at step ST106. If only the personal identification data is registered and the registered person image is not registered in the registered person information record section 101 at step ST104, the authentication history information except the registered person image is displayed at step ST106. The fact that the image to be displayed does not exist may be highlighted in an area where an image cannot be acquired and is not displayed in such a manner that a message indicating the reason why no image can be displayed, a warning message to draw attention, etc., is displayed.

The entering operation using the entering person's personal identification data reader 111a has been described as an example of the entering and leaving management processing procedure according to the entering and leaving management system in the first embodiment of the present invention. Similar comments apply to the leaving operation using the leaving person's personal identification data reader 111b.

FIG. 6 is a schematic representation to show an example of a listing screen of the authentication history information according to the entering and leaving management system in the first embodiment of the present invention. If it is certain that the person of the taken image at the authentication operation time is the person of the registered person image indicated by the personal authentication result in the authentication history information listed on the operation screen of the management terminal 141a, the identical person must be displayed on the taken image at the authentication operation time and the registered person image displayed as the authentication history information. However, if authentication of one person masquerading as another person is conducted as an IC card is stolen, etc., images of different persons are displayed side by side. As the authentication history information, past similar authentication history information is also listed. In the schematic representation of the listing screen in FIG. 6, the registered person image is an image to easily identify the face and the taken image at the authentication operation time is an image taken at a slight distance, but the mode can be set as desired depending on the form of the system.

As described above, according to the first embodiment of the present invention, the taken image at the authentication operation time and the registered person image previously associated with the personal identification data checked by the authentication management apparatus are displayed together with the authentication history information, so that an authentication history information list for easy retrieval of illegal entering and leaving as they are compared can be presented to the manager of the entering and leaving management system and the operator of the management terminal. Further, the record image at the authentication operation time associated with the authentication history information can be played back, so that the efficiency of checking a suspicious person image can be improved.

According to the first embodiment of the present invention, the registered person image indicated by the personal authentication result and the taken image at the authentication operation time are displayed together with the authentication history information, so that it becomes easy to find an illegal entering and leaving record as the images are compared.

According to the first embodiment of the present invention, if a person enters or leaves the room without authentication operation following a valid person entering or leaving the room or tailgating occurs, the tailgating state is displayed on the taken image at the authentication operation time, so that it becomes easy to find the tailgating person.

Second Embodiment

An entering and leaving management system for determining the person staying in the room for each room based on the personal authentication result of a person to be authenticated when the person performs the personal authentication operation in an authentication management apparatus and displaying authentication history information of the determined person staying in the room on a screen of a management terminal will be discussed in a second embodiment of the present invention.

Figure 7:
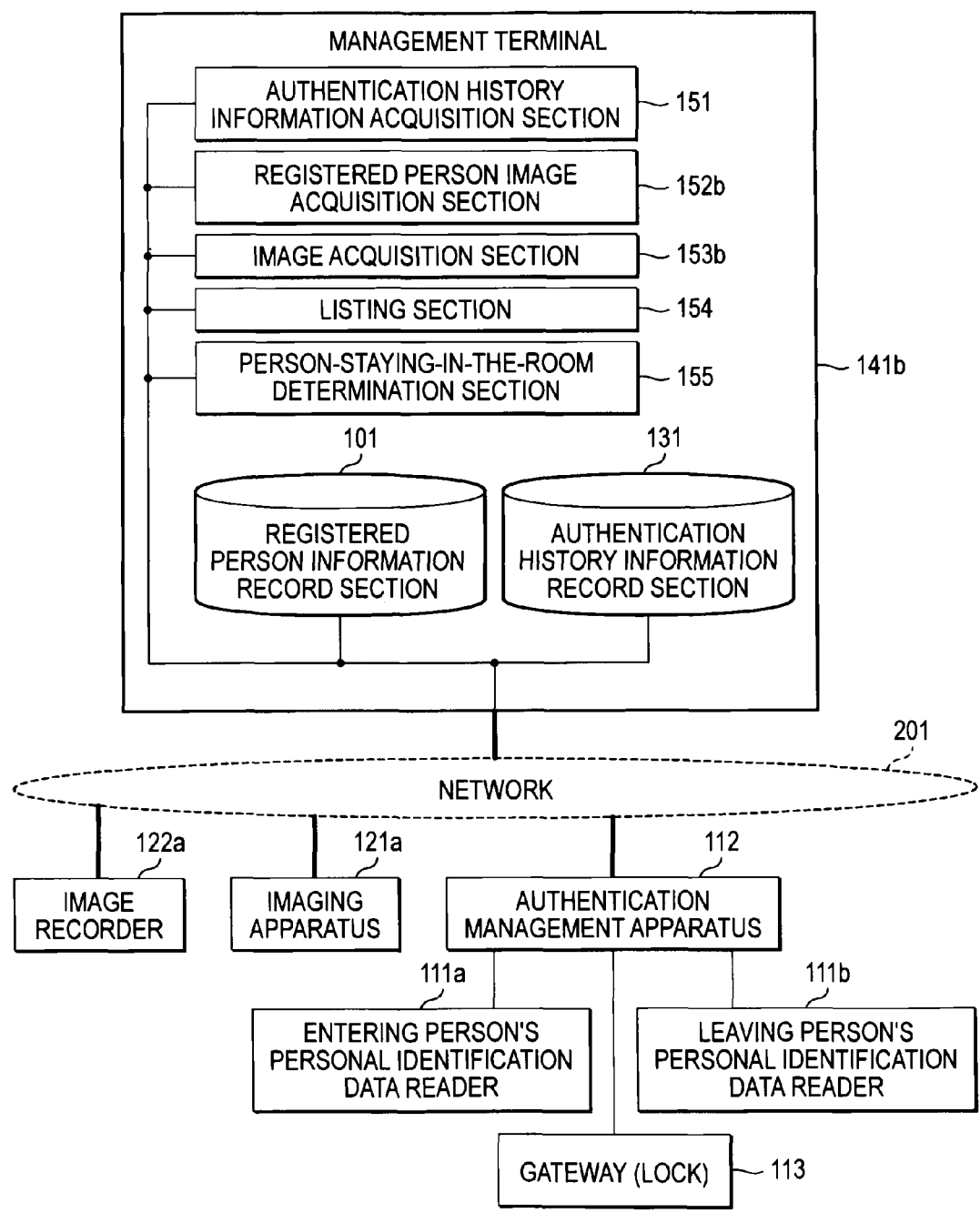
FIG. 7 is a block diagram to show a configuration example of an entering and leaving management system in a second embodiment of the present invention.

FIG. 7 is a block diagram to show a configuration example of the entering and leaving management system in the second embodiment of the present invention.

In FIG. 7, a registered person information record section 101, a personal identification data reader 111, an authentication management apparatus 112, an imaging apparatus 121a, an image recorder 122a, and an authentication history information record section 131 are similar to those denoted by the same reference numerals previously described with reference to FIG. 1 in the first embodiment of the present invention and therefore will not be discussed again. Like the management terminal 141a previously described with reference to FIG. 1 in the first embodiment of the present invention, a management terminal 141b displays authentication history information recorded in the authentication history information record section 131 on an operation screen, but differs from the management terminal 141a in the internal configuration as follows:

The internal configuration of the management terminal 141b is as follows: Authentication history information acquisition section 151 acquires the authentication history information recorded in the authentication history information record section 131. Person-staying-in-the-room determination section 155 determines the person staying in the room based on the authentication history information acquired by the authentication history information acquisition section 151. Registered person image acquisition section 152*b* acquires the registered person image recorded in the registered person information record section 101 associated with the personal identification data of the authentication history information of the person staying in the room determined by the person-staying-in-the-room determination section 155. Image acquisition section 153*b* acquires the image of the person to be authenticated, recorded in the image recorder 122*a* associated with the authentication time of the authentication history information of the person staying in the room determined by the person-staying-in-the-room determination section 155. A listing section 154 lists the registered person image acquired by the registered person image acquisition section 152*b* and the image of the person to be authenticated, acquired by the image acquisition section 153*b* on the operation screen with the authentication history information of the person staying in the room side by side.

To determine the person staying in the room based on the authentication history information of the personal authentication result of the person to be authenticated in the entering and leaving management system in the second embodiment of the present invention, both an entering person's personal identification data reader 111*a* and a leaving person's personal identification data reader 111*b* are installed as personal identification data readers 111 for managing entering and leaving, and the person with the personal identification data in the entering state without the leaving history is assumed to be the person staying in the room. The in-room time, etc., may be contained in the authentication history information. If the in-room time extends over an unnaturally long time, attention of the manager of the entering and leaving management system and the operator of the management terminal 141*b* may be called to the fact.

Figure 8:
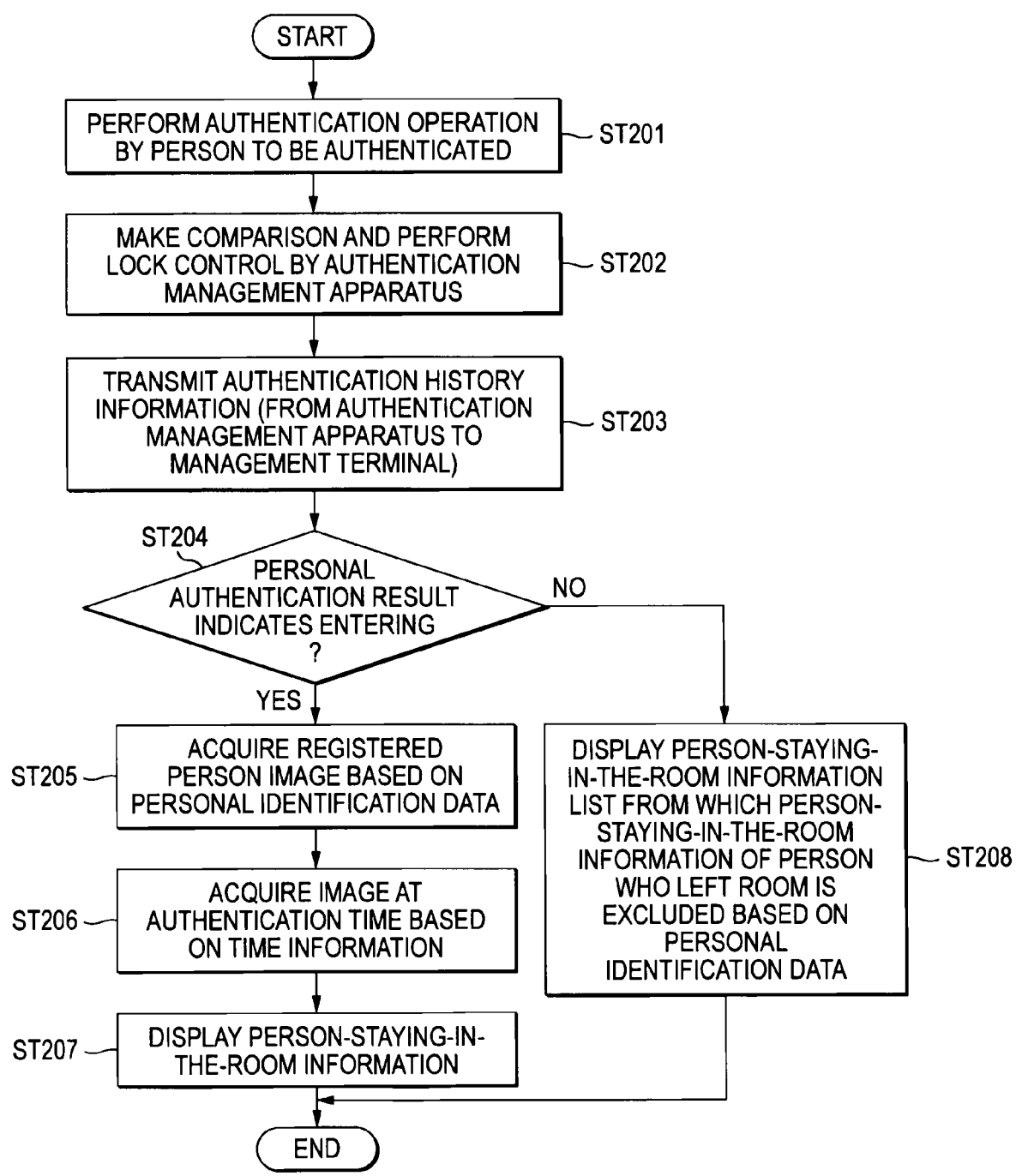
FIG. 8 is a flowchart to show an example of an entering and leaving management processing procedure according to the entering and leaving management system in the second embodiment of the present invention.

FIG. 8 is a flowchart to show an example of an entering and leaving management processing procedure according to the entering and leaving management system in the second embodiment of the present invention.

The operation at steps will be discussed with reference to FIG. 8. Steps ST201 to ST203 in FIG. 8 are similar to steps ST101 to ST103 in the flowchart showing the entering and leaving management processing procedure previously described with reference to FIG. 5 in the first embodiment of the present invention and therefore will not be discussed again.

The management terminal 141*b* determines which of entering and leaving the personal authentication result of the authentication history information read from the authentication history information record section 131 is (step ST204).

When the personal authentication result of the authentication history information read from the authentication history information record section 131 indicates entering, the management terminal 141*b* acquires the registered person image registered in the registered person information record section 101 with the personal identification data contained in the read authentication history information as a key (step ST205).

The management terminal 141*b* acquires the taken image at the authentication operation time of entering from the image recorder 122*a* with the time information of the authentication operation time of entering contained in the authentication history information read from the authentication history information record section 131 as a key (step ST206).

The management terminal 141*b* lists the authentication history information of the person staying in the room in the authentication history information read from the authentication history information record section 131, the registered person image acquired from the registered person information record section 101, and the taken image at the authentication operation time acquired from the image recorder 122*a* on the operation screen side by side (step ST207).

On the other hand, when the personal authentication result of the authentication history information read from the authentication history information record section 131 indicates leaving, the management terminal 141*b* updates the authentication history information list of the persons staying in the room with the corresponding person staying in the room who left the room excluded from the display with the personal identification data contained in the read authentication history information as a key, and lists the persons staying in the room on the operation screen of the management terminal 141*b* (step ST208).

FIG. 9 is a schematic representation to show an example of a listing screen of the authentication history information of the persons staying in the room according to the entering and leaving management system in the second embodiment of the present invention. In the authentication history information of the persons staying in the room listed on the operation screen of the management terminal 141*b*, the taken image at the authentication time of entering the room and the registered person image indicated by the personal identification data are displayed side by side for each person staying in the room.

As described above, according to the second embodiment of the present invention, the taken image at the authentication operation time and the registered person image previously associated with the personal identification data checked by the authentication management apparatus are displayed together with the authentication history information of the persons staying in the room, so that an authentication history information list for easy retrieval of illegal entering and leaving as they are compared can be presented to the manager of the entering and leaving management system and the operator of the management terminal. Further, the record image at the authentication operation time associated with the authentication history information of the persons staying in the room can be played back, so that the efficiency of checking a suspicious person image can be improved.

As described above, according to the second embodiment of the present invention, the registered person image indicated by the personal authentication result and the taken image at the authentication operation time are displayed together with the authentication history information of the persons staying in the room, so that it becomes easy to find an illegal entering and leaving record as the images are compared.

According to the second embodiment of the present invention, the effectiveness can also be enhanced in the use of finding out a suspicious person by making a comparison between the screen display of the authentication history information of the persons staying in the room and the monitor image of the inside of each room.

Third Embodiment

An entering and leaving management system for displaying an image corresponding to the authentication history information selected out of a list of the authentication history information (first embodiment) or the authentication history information of the persons staying in the room (second embodiment) listed on the screen of the management terminal on the screen of the management terminal will be discussed in a third embodiment of the present invention.

Figure 10:
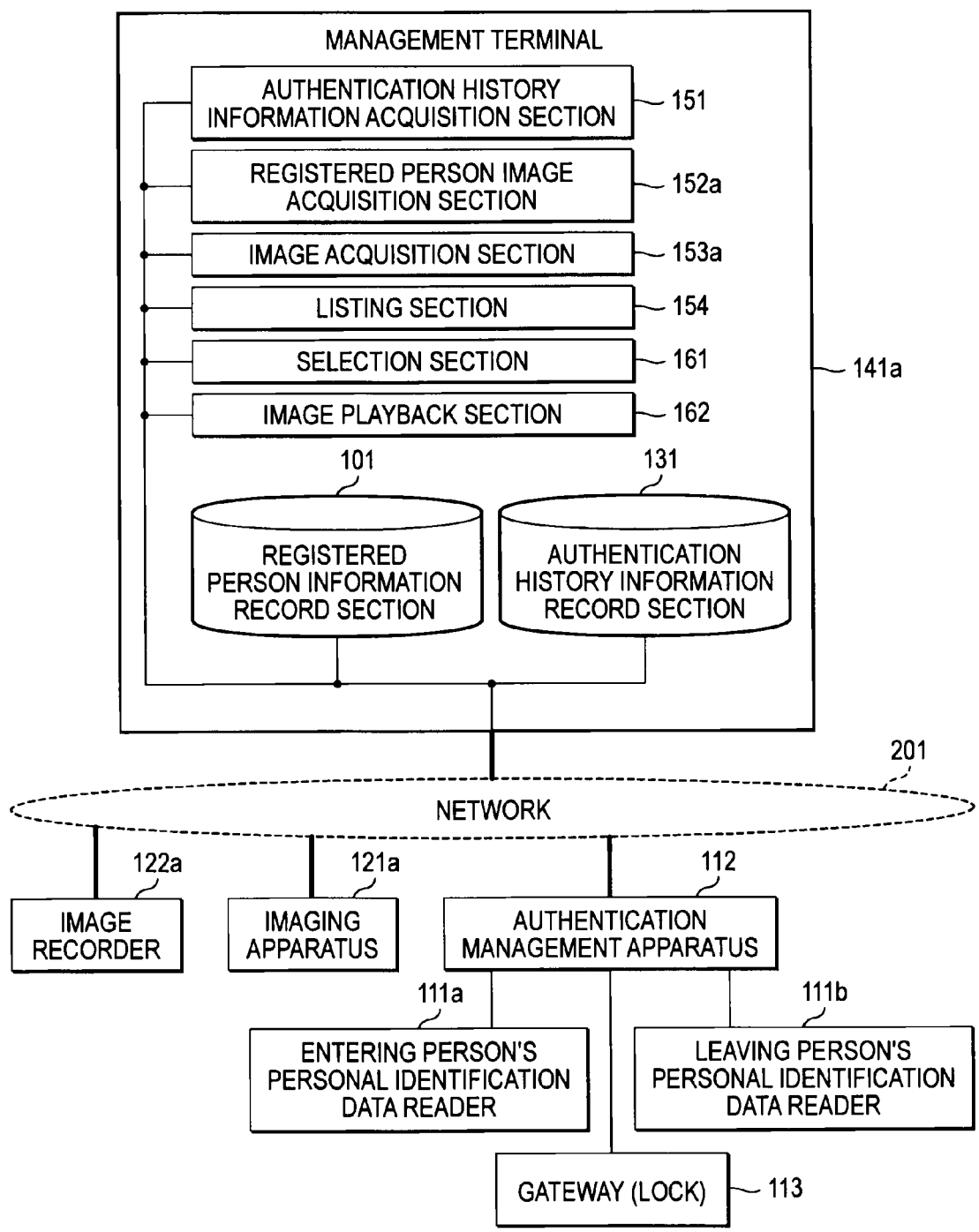
FIG. 10 is a block diagram to show a configuration example of a management terminal of an entering and leaving management system in a third embodiment of the present invention.

FIG. 10 is a block diagram to show a configuration example of a management terminal 141a of the entering and leaving management system in the third embodiment of the present invention. The management terminal 141a is the management terminal previously described with reference to FIG. 1 in the first embodiment of the present invention and components similar to those previously described with reference to FIG. 1 in the first embodiment of the present invention are denoted by the same reference numerals in FIG. 10 and therefore will not be discussed again.

In FIG. 10, a selection section 161 selects any desired authentication history information out of authentication history information listed by a listing section 154. That is, it selects any desired authentication history information out of authentication history information, registered person images, and an image of the person to be authenticated, listed on an operation screen by the listing section 154.

An image playback section 162 plays back the image of the person to be authenticated, associated with the authentication history information selected through the selection section 161 on the operation screen. That is, an image recorder 122a recording the image at the authentication operation time, an imaging apparatus 121a taking the image, the record date and time, and the like are determined based on the authentication history information selected through the selection section 161 and the record image at the authentication operation time recorded in the image recorder 122a is played back on the operation screen of the management terminal 141a.

The selection section 161 provides an interface to select any desired authentication history information out of the authentication history information listed by the listing section 154 for the manager of the entering and leaving management system and the operator of the management terminal 141a.

In the description of the third embodiment of the present invention, the management terminal 141a of the first embodiment of the present invention in FIG. 1 is provided with the selection section 161 and the image playback section 162 for selecting a record image out of the listed authentication history information and playing back the image. However, the management terminal 141b of the second embodiment of the present invention in FIG. 7 may be provided with the selection section 161 and the image playback section 162 for selecting a record image out of the listed authentication history information of the persons staying in the room and playing back the image.

As described above, the third embodiment of the present invention provides similar advantages to those of the first and second embodiments of the present invention.

According to the third embodiment of the present invention, the record image at the authentication operation time associated with the authentication history information can be played back, so that the efficiency of checking the record image of a suspicious scene can be improved.

Fourth Embodiment

An entering and leaving management system for specifying an image of an image frame from the image selected out of a list of the authentication history information (first embodiment) or the authentication history information of the persons staying in the room (second embodiment) listed on the screen of the management terminal and registering the image in a registered person information record section will be discussed in a fourth embodiment of the present invention.

Figure 11:
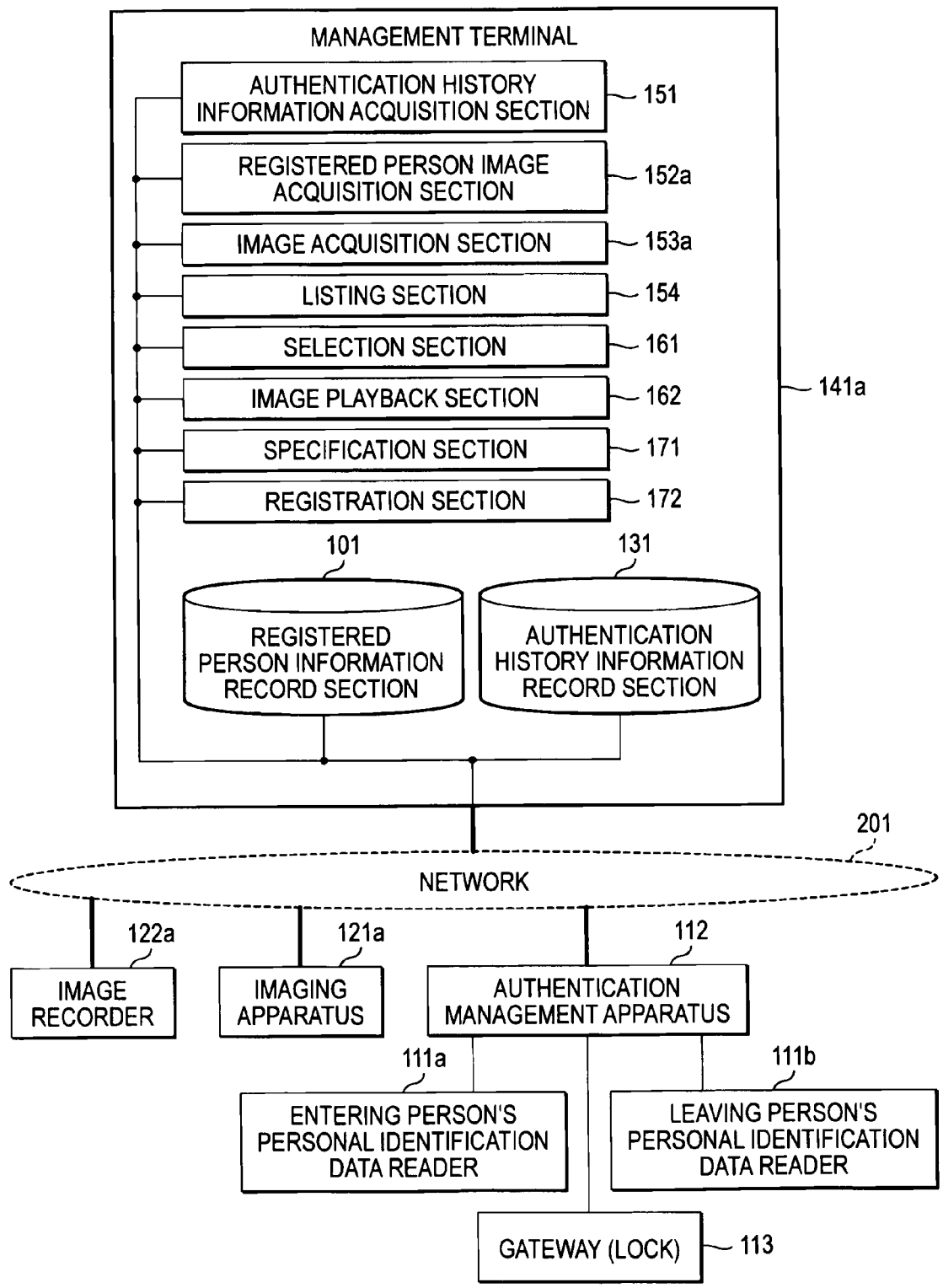
FIG. 11 is a block diagram to show a configuration example of a management terminal of an entering and leaving management system in a fourth embodiment of the present invention.

FIG. 11 is a block diagram to show a configuration example of a management terminal 141a of the entering and leaving management system in the fourth embodiment of the present invention. The management terminal 141a is the management terminal previously described with reference to FIG. 10 in the third embodiment of the present invention and components similar to those previously described with reference to FIG. 10 in the third embodiment of the present invention are denoted by the same reference numerals in FIG. 11 and therefore will not be discussed again.

In FIG. 11, a specification section 171 specifies an image of any desired image frame from the image of the person to be authenticated, played back on an operation screen by the image playback section 162. A registration section 172 registers the image of the image frame specified from the image of the person to be authenticated through the specification section 171 in a registered person information record section 101 as a registered person image.

As a modified example, the specification section 171 may specify an image of any desired image frame from the image of the person to be authenticated, displayed by listing section 154 selected through selection section.

That is, if the record image played back by the image playback section 162 is display checked more easily than display of the listing section 154, the specification section 171 may specify an image of any desired image frame from the record image played back by the image playback section 162. On the other hand, if the person to be authenticated can be sufficiently checked from the record image displayed by the listing section 154 as in the modified example, the specification section 171 may specify an image of any desired image frame from the record image displayed by the listing section 154. One of the specification methods may be determined according to the system configuration and specifications, namely, the record image size, the display size, the playback display size, and the like and may be provided for the entering and leaving management system or both the specification methods may be adopted.

The specification section 171 provides an interface to specify an image from the record image at the authentication operation time played back by the image playback section 162 or the listing section 154 for the manager of the entering and leaving management system and the operator of the management terminal 141a.

For example, the specification section 171 may specify and register an image of any desired image frame adapted to the orientation and the angle of the face or the body from the record image according to operation of the manager of the entering and leaving management system or the operator of the management terminal 141a. Not only the image of the image frame specified from the record image, but also an image input from the outside of the entering and leaving management system, for example, the previously sent image of a visitor may be able to be specified and registered. An image read from printed matter or a photo or an image taken with a digital camera may be able to be specified and registered.

For example, the specification section 171 may automatically specify an image of any desired image frame from the record image independently of operation of the manager of the entering and leaving management system or the operator of the management terminal 141a. In this case, for example, the image of the image frame at the personal authentication operation time is applied.

Further, as an example, when a person passes through a gateway where an authentication management apparatus 112 is installed at a reception desk or office at the main entrance or the front door in the entering and leaving management region, the person to be authenticated at the authentication operation time may be taken using an imaging apparatus 121b for taking an image of the person to be authenticated, the image may be associated with personal identification data, and the image may be specified and be registered in the registered person information record section 101 independently of operation of the manager of the entering and leaving management system or the operator of the management terminal 141*a*. At a reception desk or office where a guide exists, personal identification data can be generated from check information of the status, the department the registered person is attached to, etc., and can be registered in the registered person information record section 101 in association with the specified image from the taken image.

In this case, a step of requesting the manager of the entering and leaving management system or the operator of the management terminal 141*a* to confirm whether or not image registration is required may exist. At this point in time, the number of images to be registered is not narrowed to one and a plurality of candidate images are specified and presented and at the registering time from the step at which the manager of the entering and leaving management system or the operator of the management terminal 141*a* confirms, the image adapted to the orientation and the angle of the face or the body may be specified.

As the registered person image, various types of images can be used according to the purpose and the use, such as an image with a face taken in close-up and a full-length image from which dress can be grasped.

In the description of the fourth embodiment of the present invention, the management terminal 141*a* of the third embodiment of the present invention in FIG. 10 is provided with the specification section 171 and the registration section 172 for specifying and registering the image of the image frame of the record image selected out of the listed authentication history information. However, the management terminal 141*b* of the second embodiment of the present invention in FIG. 7 may be provided with the selection section 161, the image playback section 162, the specification section 171 and the registration section 172 for specifying and registering the image of the image frame of the record image selected out of the listed authentication history information of the persons staying in the room in the management terminal 141*b*.

As described above, the fourth embodiment of the present invention provides similar advantages to those of the first to third embodiments of the present invention.

According to the fourth embodiment of the present invention, the registered person image of the personal identification data can be specified according to operation of the manager of the entering and leaving management system, so that the registered person image adapted to the orientation and the angle of the face or the body can be registered from the record image. The registered person image can also be registered from any other image than the record image.

As described above, according to the fourth embodiment of the present invention, the registered person image of the personal identification data is specified and registered independently of operation of the manager of the entering and leaving management system, so that intricate registration work is not required. The present invention can also be applied to the case where it is difficult to previously register an image such as a registered person image of a visitor, etc., not registered in the entering and leaving management system.

Fifth Embodiment

An entering and leaving management system for specifying an image of an image frame from the image selected out of a list of the authentication history information (first embodiment) or the authentication history information of the persons staying in the room (second embodiment) listed on the screen of the management terminal, extracting a partial image from the specified image, and registering the extracted partial image in a registered person information record section will be discussed in a fifth embodiment of the present invention.

Figure 12:
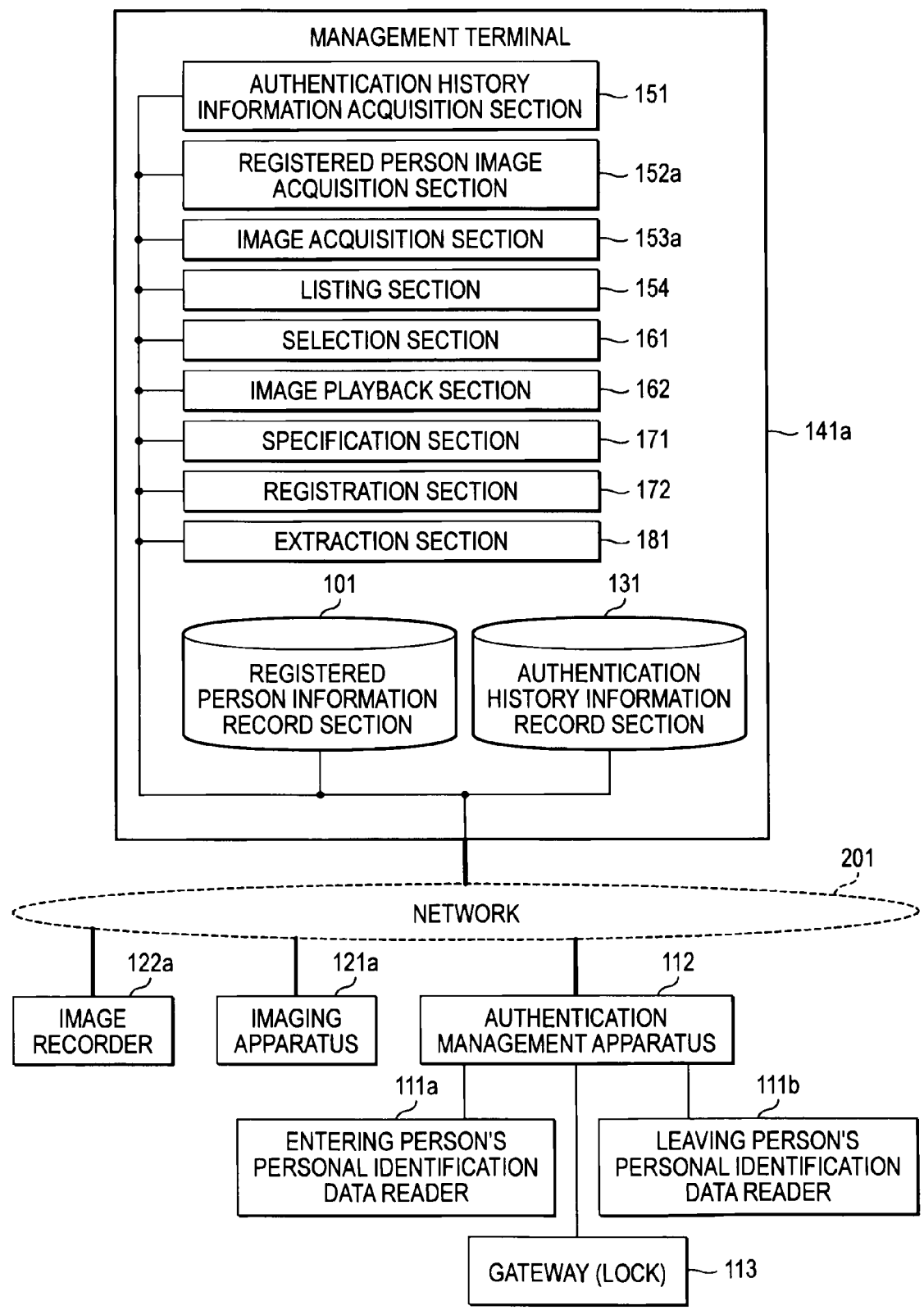
FIG. 12 is a block diagram to show a configuration example of a management terminal of an entering and leaving management system in a fifth embodiment of the present invention.

FIG. 12 is a block diagram to show a configuration example of a management terminal 141*a* of the entering and leaving management system in the fifth embodiment of the present invention. The management terminal 141*a* is the management terminal previously described with reference to FIG. 11 in the fourth embodiment of the present invention and components similar to those previously described with reference to FIG. 11 in the fourth embodiment of the present invention are denoted by the same reference numerals in FIG. 12 and therefore will not be discussed again.

In FIG. 12, an extraction section 181 extracts a partial image from the image specified through specification section 171. A registration section 172 registers the partial image extracted through the extraction section 181 in a registered person information record section 101.

The extraction section 181 provides an interface to extract a partial image from the image specified through the specification section 171 for the manager of the entering and leaving management system and the operator of the management terminal 141*a*.

The method of extracting a partial image from the image specified through the specification section 171 may be a method of specifying a diagonal line of a rectangle extracted on the image, for example.

In the description of the fifth embodiment of the present invention, the management terminal 141*a* of the fourth embodiment of the present invention in FIG. 11 is provided with the extraction section 181 for extracting and registering a partial image from the image of the image frame of the specified record image. However, the management terminal 141*b* of the second embodiment of the present invention in FIG. 7 may be provided with the selection section 161, the image playback section 162, the specification section 171, the registration section 172, and the extraction section 181 for extracting and registering a partial image from the image of the image frame of the specified record image.

As described above, the fifth embodiment of the present invention provides similar advantages to those of the first to fourth embodiments of the present invention.

According to the fifth embodiment of the present invention, the registered person image of the personal identification data can be partially extracted and registered from the record image according to operation of the manager of the entering and leaving management system, so that if the listed registered person images cannot be displayed in a sufficient size on an operation screen, only the more appropriate portion extracted is displayed and thus it becomes easy to determine whether or not person check is required on the operation screen listing the registered person images at the stage before detailed check based on playback of the record image.

As described above, according to the fifth embodiment of the present invention, the registered person image of the personal identification data can be partially extracted and registered from the record image according to operation of the manager of the entering and leaving management system, so that the registered person image can be registered without providing any unnecessary margin, and the storage cost of the registered person images can be reduced.

In the entering and leaving management system in each of the first to fifth embodiments of the present invention, the management terminal can be implemented as a dedicated terminal to the entering and leaving management, but may be implemented as a computer using a program for executing the entering and leaving management processing procedure and function as shown in FIG. 5, FIG. 8, for example.

As described above, according to the embodiments of the present invention, the taken image at the authentication operation time and the registered person image previously associated with the personal identification data checked by the authentication management apparatus are displayed together with the authentication history information or the authentication history information of the persons staying in the room, so that an authentication history information list for easy retrieval of illegal entering and leaving as they are compared can be presented to the manager of the entering and leaving management system and the operator of the management terminal. Further, the record image at the authentication operation time associated with the authentication history information or the authentication history information of the persons staying in the room can be played back, so that the efficiency of checking a suspicious person image can be improved.

What is claimed is:

1. An entering and leaving management system comprising:
   a registered person information record section configured to record personal identification data and a registered person image, which is an image of a person, in association with each other;
   a personal identification data reader configured to read the personal identification data of a person to be authenticated;
   an authentication management apparatus configured to check the personal identification data recorded in the registered person information record section based on the personal identification data of the person to be authenticated read through the personal identification data reader and control unlocking and locking of a gateway based on the personal authentication result;
   an imaging apparatus configured to take an image of the person to be authenticated when the person to be authenticated operates the personal identification data reader;
   an image recorder configured to record the image of the person to be authenticated, taken by the imaging apparatus;
   an authentication history information record section configured to record the personal authentication result of the personal identification data checked by the authentication management apparatus and the authentication time as authentication history information; and
   a management terminal configured to display the authentication history information recorded in the authentication history information record section on an operation screen,
   wherein the management terminal includes:
   an authentication history information acquisition section configured to acquire the authentication history information recorded in the authentication history information record section;
   a registered person image acquisition section configured to acquire the registered person image recorded in the registered person information record section associated with the personal identification data of the authentication history information acquired by the authentication history information acquisition section;
   an image acquisition section configured to acquire the image of the person to be authenticated recorded in the image recorder at the authentication time of the authentication history information acquired by the authentication history information acquisition section; and
   a listing section configured to list the registered person images acquired by the registered person image acquisition section and the image of the person to be authenticated acquired by the image acquisition section on the operation screen side by side with the authentication history information.

2. The entering and leaving management system as claimed in claim 1, wherein the listing section of the management terminal displays the image of the person to be authenticated, acquired by the image acquisition section on the operation screen as a still image.

3. The entering and leaving management system as claimed in claim 1, wherein the management terminal further includes:
   a selection section configured to select any desired authentication history information out of the authentication history information listed by the listing section; and
   a playback section for playing back the image of the person to be authenticated, associated with the authentication history information selected through the selection section on the operation screen.

4. The entering and leaving management system as claimed in claim 3, wherein the management terminal further includes:
   a specification section configured to specify an image of any desired image frame from the image of the person to be authenticated, selected through the selection section; and
   a registration section configured to register the image of the image frame specified from the image of the person to be authenticated, specified through the specification section in the registered person information record section as a registered person image.

5. The entering and leaving management system as claimed in claim 3, wherein the management terminal further includes:
   a specification section configured to specify an image of any desired image frame from the image of the person to be authenticated, played back on the operation screen by the playback section; and
   a registration section configured to register the image of the image frame specified from the image of the person to be authenticated, specified through the specification section in the registered person information record section as a registered person image.

6. The entering and leaving management system as claimed in claim 4, wherein the management terminal further includes:
   an extraction section configured to extract an image of any desired partial area from the image of the image frame specified from the image of the person to be authenticated, specified through the specification section, and
   wherein the registration section of the management terminal registers the image of the partial area extracted by the extraction section in the registered person information record section as a registered person image.

* * * * *